(12) United States Patent
Bachman et al.

(10) Patent No.: US 8,165,914 B2
(45) Date of Patent: Apr. 24, 2012

(54) METHOD OF DETERMINING INVENTORY LEVELS

(75) Inventors: Tovey C. Bachman, McLean, VA (US); Carol A. Dezwarte, Falls Church, VA (US)

(73) Assignee: Logistics Management Institute, McLean, VA (US)

( * ) Notice: Subject to any disclaimer, the term of this patent is extended or adjusted under 35 U.S.C. 154(b) by 1222 days.

(21) Appl. No.: 11/802,072

(22) Filed: May 18, 2007

(65) Prior Publication Data
US 2007/0282669 A1    Dec. 6, 2007

Related U.S. Application Data

(60) Provisional application No. 60/811,118, filed on Jun. 6, 2006.

(51) Int. Cl.
G06Q 30/00    (2006.01)
(52) U.S. Cl. .......... 705/8; 705/7; 705/9; 705/10; 705/28
(58) Field of Classification Search ................... 705/7, 8, 705/10, 28, 9
See application file for complete search history.

(56) References Cited

U.S. PATENT DOCUMENTS

| | | | |
|---|---|---|---|
| 5,128,861 A | 7/1992 | Kagami et al. | |
| 5,237,496 A | 8/1993 | Kagami et al. | |
| 5,615,109 A | 3/1997 | Eder | |
| 5,897,624 A | 4/1999 | Ramaswamy | |
| 5,963,919 A | 10/1999 | Brinkley et al. | |
| 6,006,192 A | 12/1999 | Cheng et al. | |
| 6,006,202 A | 12/1999 | Ramaswamy et al. | |
| 6,021,396 A | 2/2000 | Ramaswamy et al. | |
| 6,144,945 A | 11/2000 | Garg et al. | |
| 6,205,431 B1 | 3/2001 | Willemain et al. | |
| 7,499,766 B2 | 3/2009 | Knight et al. | |
| 2002/0169657 A1* | 11/2002 | Singh et al. ..................... | 705/10 |
| 2002/0188529 A1 | 12/2002 | Krever | |

(Continued)

FOREIGN PATENT DOCUMENTS

EP    1 647 926    4/2006

(Continued)

OTHER PUBLICATIONS

Roger Erikson, "Applying Cooperative Coevolution to Inventory Control Parameter Optimization," Dissertation in the Department of Computer Science, University of Skövde, Sep. 1996, 111 pages.

(Continued)

*Primary Examiner* — Nga B. Nguyen
(74) *Attorney, Agent, or Firm* — Staas & Halsey LLP (57) ABSTRACT

A computer-readable medium executing a method of determining desired stock levels is provided. Demand histories, including peak demands, for each of a plurality of items are determined. The items are ranked, based on unit price, to produce a ranked list, which is divided into price percentiles. Multipliers are assigned to each of the items, based on the respective price percentiles, and stock levels are determined for each of the items by multiplying the peak demand of each item and the respective assigned multiplier. Order quantities are assigned to each of the items based on price percentiles. A service level metric and a resource metric are determined based on the stock levels and the respective order quantities, and the service level metric and resource metric are compared with a desired service level range and a desired resource metric range to determine whether the determined stock levels are the desired stock levels.

40 Claims, 7 Drawing Sheets

U.S. PATENT DOCUMENTS

| | | | |
|---|---|---|---|
| 2003/0055712 A1* | 3/2003 | Eltchaninoff et al. | 705/10 |
| 2003/0101107 A1* | 5/2003 | Agarwal et al. | 705/28 |
| 2004/0068344 A1 | 4/2004 | Tsuji | |
| 2005/0075949 A1 | 4/2005 | Uhrig et al. | |
| 2005/0283404 A1 | 12/2005 | Young | |
| 2005/0288989 A1* | 12/2005 | Kim et al. | 705/10 |
| 2006/0009988 A1 | 1/2006 | McCormick | |
| 2006/0047559 A1* | 3/2006 | Jacoby et al. | 705/10 |
| 2006/0085299 A1 | 4/2006 | Goll et al. | |
| 2007/0124009 A1 | 5/2007 | Bradley et al. | |
| 2007/0282669 A1 | 12/2007 | Bachmann et al. | |
| 2009/0240544 A1 | 9/2009 | Cheng et al. | |

FOREIGN PATENT DOCUMENTS

| | | |
|---|---|---|
| JP | 7-249082 | 9/1995 |
| JP | 2009-187151 | 8/2009 |
| WO | 00/46733 | 8/2000 |
| WO | 2004/034305 | 4/2004 |
| WO | 2005/008437 | 1/2005 |
| WO | 2006/028952 | 3/2006 |
| WO | 2009/091522 | 7/2009 |

OTHER PUBLICATIONS

G. A. Vignaux, "Some Examples of Dimensional Analysis in Operations Research and Statistics," School of Mathematical and Computing Science, Victoria University of Wellington, New Zealand, Oct. 16, 2005, 19 pages.

Kaan K. Katircioglu, "Essays in Inventory Control," Thesis in the Commerce and Business Administration, The University of British Columbia, May 17, 1996, 146 pages.

Inventory Management for Items with Sporadic Demand; presented Jun. 2000 by Tovey Bachman.

Inventory Management for Items with Sporadic Demand, Part II; presented Jun. 2002 by Tovey Bachman.

Alternative Inventory Policies for Numeric Stockage Objective (NSO) Items; presented Oct. 2, 2002, by Tovey Bachman.

Alternate NSO Policies for the C-5 Preliminary Foldings; presented Jan. 13, 2003 by Tovey Bachman.

Aging Aircraft Support Analyses: Stocking Policy Model Assessment: Update CET26; presented Jun. 23, 2004 by LMI.

Reducing NMCS Incidents for Infrequetnly Demanded Parts; presented Jun. 24, 2004 by LMI.

Aging Aircraft Support Analyses: Low Density-High Demand; Final Briefing CET 15; presented Aug. 18, 2004 by LMI.

Reducing NMCS Incidents for Infrequently Demanded Part; presented Nov. 30, 2004 by LMI.

Peak Policy Analysis Land and Maritime Systems; presented May 3, 2005 by LMI.

B-1 NSO Support: Status and Preliminary Results; presented Oct. 21, 2004 by LMI.

Reducing Aircraft Down for Lack of Parts with Sporadic Demand, presented Jun. 21, 2005 by LMI.

Peack Policy in BSM: Better Management of Sporadic Demand Items; presented Jan. 3, 2006 by the Defense Logistics Agency (DLA).

Peack Policy in BSM II: Better Managemet of Sporadic Demand Items; presented Sep. 13, 2006 by Defense Logistics Agency (DLA).

DLA Weapon System Sustainment example project poster; presented Apr. 16, 2007.

* cited by examiner

| Parameter | Set of Peak Multipliers |
|---|---|
| 1.0 | 1.0, 2.0, 3.0, 4.0 [these are the source policy's peak multipliers] |
| 0.25 | 0.25, 0.5, 0.75, 1.0 |
| 0.50 | 0.5, 1.0, 1.5, 2.0 |
| 1.50 | 1.5, 3.0, 4.5, 6.0 |
| 2.50 | 2.5, 5.0, 7.5, 10.0 |

Fig. 8

METHOD OF DETERMINING INVENTORY LEVELS

CROSS-REFERENCE TO RELATED APPLICATION

This application claims priority to U.S. Provisional Application No. 60/811,118 entitled Method for Determining Inventory Levels, by Bachman et al., filed Jun. 6, 2006 and incorporated herein by reference.

GOVERNMENT RIGHTS

This invention is a result of a collaborative effort between Logistics Management Institute and the Defense Logistics Agency. The U.S. Government has a paid up license in this invention.

BACKGROUND

1. Field

The present invention relates generally to a method of determining inventory levels, and more particularly, to a method of determining inventory reorder levels and order-up-to levels.

2. Description of the Related Art

In inventory management, some items are demanded more frequently and some less frequently. For example, certain repair parts that apply to complex systems and are infrequently demanded must still be stocked because they are essential to maintaining that system. Due to the sporadic demand, however, it is difficult to decide when to order the infrequently demanded items and in what quantities.

For frequently demanded items, there is a well-developed theory and set of processes for ordering that balances the investment in inventory with customer service. However, for items that are infrequently demanded, the theory used for ordering frequently demanded items breaks down and is not effective.

An inventory management system for a single site typically manages each item using two control levels: an item's reorder point (ROP), which determines when to order the item, and a requisitioning objective (RO), which determines how much of the item to order. An order is placed when assets on-hand plus on-order decrease to or below the ROP, and the difference between the RO and the current assets is the quantity ordered. The RO is usually the ROP plus a nominal order quantity, Q, which is often a Wilson Lot-size formula (EOQ) ("economic order quantity"). Thus Q is the quantity ordered if assets drop exactly to the ROP. The ROP is an estimate of lead-time demand (LTD) plus a safety level that protects against variability in LTD.

Safety-level computations usually treat the number of demands in a lead-time as a random variable with a tractable theoretical probability distribution (e.g., Poisson, negative binomial, Laplace, or normal), estimate the mean and variance, and derive expressions for expected backorders and inventory cost as a function of the safety level. Mathematical optimization techniques are then used to set item safety levels to balance inventory investment with expected backorders, probability of a stockout, or system availability. This approach to optimizing ordering policies has been developed and extended to optimize policies across a supply chain, account for repair actions as well as ordering actions, and treat items that apply to diverse, complex systems with distinct availability goals. When there is sufficient demand data to characterize the lead-time demand distribution, but theoretical distributions do not fit well, non-parametric techniques, such as the bootstrap method, may apply.

However, for sporadic-demand items—items that experience long and irregular periods of inactivity between demands (i.e., periods of inactivity from six months to several years)—lead-time demand is usually zero. Forecasting lead-time demand and demand variance for these items is difficult. As mean and variance cannot be estimated in a meaningful way, a theoretical demand probability distribution is impractical. Use of empirical demand probabilities is possible, but for many sporadic-demand items, the data are too sparse to build a reasonable lead-time demand distribution. For example, if an item's only observed demands in the last five years comprise a demand for 8 units and another demand for 50 units, there is no reason to believe a demand for 20 units has a probability of zero.

Inventory management specialists have sought a successful approach to setting ROPs and ROs for sporadic-demand items using heuristic methods. However, the policies used fail to link inventory investment to service level, and generally do not work well. More sophisticated approaches include approaches taken by Croston and Kruse.

Croston shows that, when there is a constant probability of demand in a time interval, high fill rates can be obtained by basing ROPs on separate forecasts of both the time of next demand and demand size (Croston, J. D., "Forecasting Stock Control for Intermittent Demands"). Kruse divides an item's population into subsets by pooling items with similar lead-times, prices, and demand frequencies to thereby obtain enough demand data for empirical lead-time demand probabilities. Kruse assigns each item subset a common ROP based on a fill rate goal. However, for very irregular demand, these approaches have not been shown to improve service levels (e.g., reduce customer wait-time) without significantly increasing inventory investment.

Typically, inventory management systems that distinguish between items with more regular demand and those with sporadic demand use a three-part policy. One part is an ordering policy for frequently-demanded items with ROPs and ROs based on statistical forecasts. The second part is an activity threshold, generally set in terms of historical requisition frequency and quantity, which separates frequently-demanded items from sporadic-demand items. Part three is a heuristic ordering policy employed for items with activity levels below the activity threshold.

In an example of a three-part ordering policy in an inventory management system, frequent-demand items are separated from sporadic-demand items with an activity threshold that is based on the previous year's demand. For items with demand activity below the activity threshold, the inventory management system uses a heuristic policy that sets the RO to the demand quantity in the preceding year and the ROP to half the RO. A problem inherent in this approach is that the heuristic policy does not link inventory cost to service level. Further, items may migrate over the course of the year between frequent-demand and sporadic-demand status, causing excessive ordering and changes in ROs.

SUMMARY

To solve the above and related problems, it is a potential object of the present invention to provide a computer-readable medium to execute a method of determining inventory reorder levels.

It is another potential object to provide a computer-readable medium to execute a method of determining order quantities.

It is one potential goal to provide an ordering policy for sporadic-demand items, with the goal of reducing customer wait-time without increasing inventory investment.

Additional aspects and advantages will be, in part, set forth in the description which follows and, in part, will be obvious from the description, or may be learned by practice.

The inventors propose a computer-readable medium executing a method of determining desired stock levels. The method determines demand histories, including peak demands, for each of a plurality of items. A desired service metric range and a desired resource metric range are determined. Order quantities are assigned to each of the items. The method further includes ranking the items, based on unit price, to produce a ranked list and dividing the ranked list into groups of price percentiles. Multipliers are assigned to each of the items, based on the respective groups of price percentiles. Stock levels are determined for each of the items by multiplying the peak demand of each item and the respective assigned multiplier. A resource metric and a service level metric are determined based on the determined stock levels for each of the items and the respective order quantities, and the resource metric and the service level metric are compared with the desired resource metric range and the desired service level metric range, respectively, and a determination is made as to whether the resource level and the service level fall within the desired resource level range and the desired service level range, respectively. The determined stock levels are determined as the desired stock levels if the resource metric and the service level metric both falls within the desired ranges, respectively.

The resource metric is determined based on at least one of an average inventory investment amount, a maximum inventory investment amount, an amount of cash outlays to replenish stock, a volume of inventory, a weight of inventory, an amount of storage space required for inventory, an inventory turn rate, and a loss rate due to shelf life expirations. The service level metric is determined based on at least one of a customer wait-time, a unit wait-time, a requisition wait-time, a unit fill-rate, a requisition fill-rate, an average number of outstanding backorders, an average backorder duration, a supply availability, a material availability, a system down time due to lack of parts, a percent of systems down due to lack of parts, a number of cannibalizations performed, and a number of expediting actions required.

The dividing the ranked list, assigning multipliers, determining stock levels, determining the resource metric, determining the service level metric, comparing the resource metric and the service level metric with the desired resource metric range and the desired service level metric, and determining whether the determined stock levels are the desired stock levels is repeated, if at least one of the resource metric and the service level metric do not fall within the desired resource metric range and the desired service level metric range, respectively.

The multipliers are typically assigned such that smaller multipliers are used for more expensive items and larger multipliers are used for less expensive items.

The method additionally includes determining price-based multipliers, determining a plurality of parameters, scaling the price-based peak multipliers by each of the plurality of parameters, determining a resource metric and a service level metric for each of the plurality of parameters, and creating a metrics curve using the determined resource metric and the determined service level metric, by plotting the determined resource metric against the determined service level metric.

Also, the determining a resource metric and a service level metric for each of the parameters includes multiplying the peak demand of each item by the scaled price-based peak multiplier for each of the plurality of items to calculate parameter-specific stock levels for each parameter. A parameter-specific resource metric is calculated for each of the parameters based on the parameter-specific stock levels and the assigned order quantities for each of the items. A parameter-specific service level metric is determined for each of the parameters based on the calculated parameter-specific stock levels and the assigned order quantities for each of the plurality of items, and parameter-specific resource metric is plotted against the parameter-specific service level metric for each parameter on a single plot to create a metrics curve.

The inventors also propose a method of determining desired order quantities including determining demand histories, including peak demands, for each of a plurality of items, and determining a desired replenishment workload metric range and a desired resource metric range. The items are ranked, based on unit price, to produce a ranked list. The method further includes dividing the ranked list into groups of price percentiles. Multipliers are assigned to each of the items, based on a first set of groups of price percentiles, and order quantities are assigned to each of the items based on a second set of groups of price percentiles. The stock level for each of the items is calculated by multiplying the peak demand of each item and the respective multiplier. A resource metric and a replenishment workload metric are each determined based on the stock levels for the items and the respective order quantities. The resource metric and the replenishment workload metric are compared with the desired resource metric range and the desired replenishment workload metric range, a determination is made as to whether the resource metric and the replenishment workload metric both fall within the desired resource metric range and the desired replenishment workload metric range, respectively. If the resource metric and the replenishment workload metric fall within the desired resource metric range and the desired replenishment workload metric range, respectively, it is determined that the assigned order quantities are the desired order quantities.

The method of determining desired order quantities may further include determining a desired service level metric range and determining a service level metric based on the stock levels determined for each of the plurality of items and the respective order quantities after assigning order quantities and calculating stock levels for each of the plurality of items. The method may then include comparing the service level metric with the desired service level metric range to determine whether the service level metric falls within the desired service level metric range and determining that the assigned order quantities are the desired order quantities if the resource metric, the replenishment workload metric and the service level metric all fall within the desired resource metric range, the desired replenishment workload metric range, and the desired service level metric range, respectively.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Reference will now be made in detail to the present preferred embodiments, examples of which are illustrated in the accompanying drawings, wherein like reference numerals refer to the like elements throughout. The embodiments are described below by referring to the Figures. A computer-readable storage medium encoded with instructions for causing a processor to execute a method of determining desired stock levels is provided. A computer-readable storage medium encoded with instructions for causing a processor to execute a method for determining desired order quantities is provided.

Figure 1:
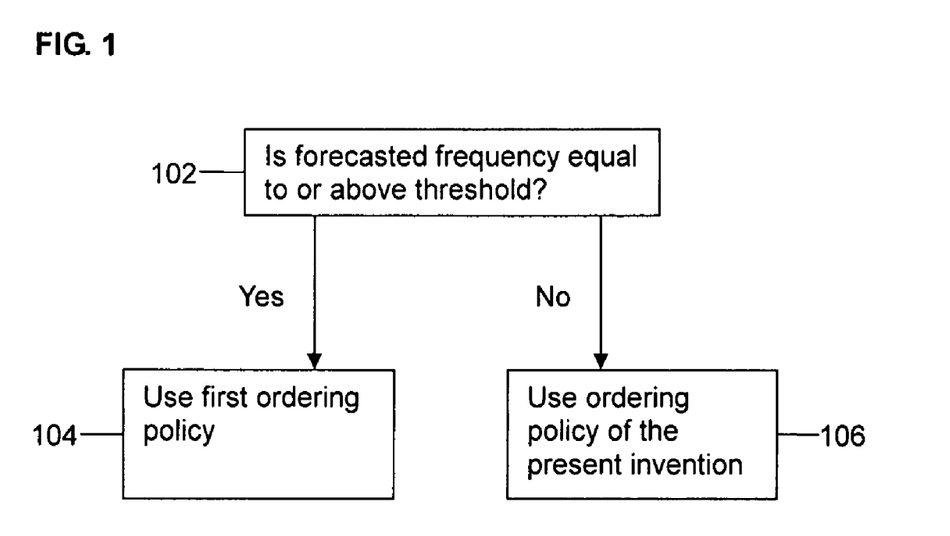
FIG. 1 is a flowchart determining application of the method according to one potential embodiment of the present invention.

FIG. 1 is a flowchart to determine whether a first ordering policy is to be used for item replenishment or whether the proposed method is to be used.

At item 102, a determination is made as to whether a forecasted demand frequency is above a threshold. An item's demand frequency is a fraction of time intervals, for example, quarters in a year, with demand, irrespective of quantity. Thus, whether the quantity ordered for an item is for one unit or for 100 units, if the item is ordered in the time interval, the time interval is interpreted to be an interval with demand. The demand frequency is determined by examining the number of time intervals with demand within a cumulative period, for example, two quarters of demand within a five quarter cumulative period. Here, the demand frequency for the item to be replenished is 0.4.

An activity history for each item is created based on demand history for the item. For example, the demand for each quarter is replaced by one when the quantity demanded for the item is positive and demand quantities for quarters with zero item demand are unchanged. Each time interval, for example, each quarter, a single exponential smoothing forecast is applied to the activity history in order to forecast future demand frequency. At 102, the forecasted demand frequency is examined against an activity threshold. At 104, if the forecasted demand frequency is equal to or greater than the activity threshold, a first ordering policy is used. If the forecasted demand frequency for the item is less than the activity threshold, at 106, the proposed ordering policy is used.

Figure 2:
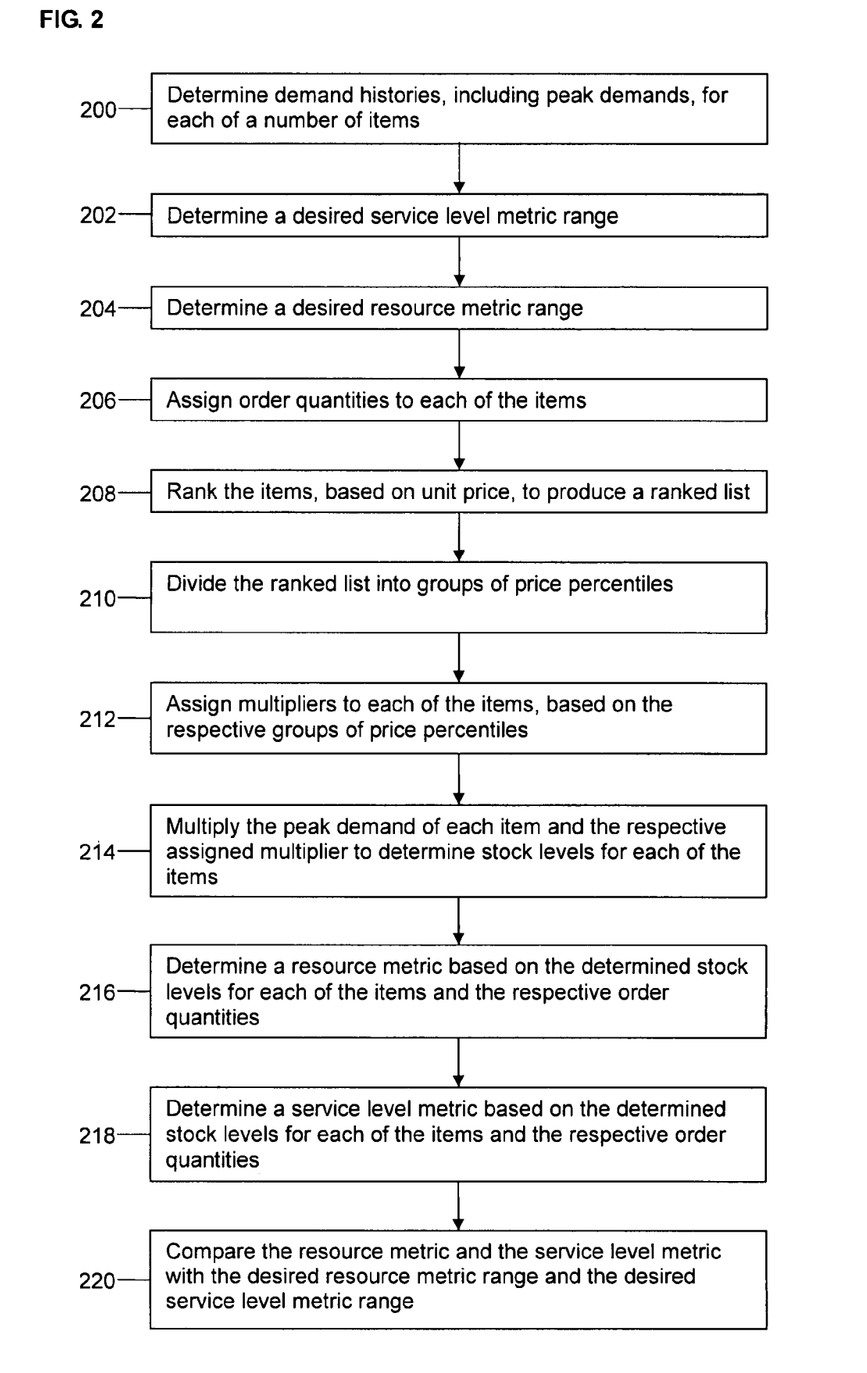
FIG. 2 is a flowchart of a method of determining desired stock levels, according to a first embodiment.

FIG. 2 is a flowchart illustrating the proposed ordering policy. The ordering policy is a method for determining desired stock levels. At 200, demand histories including peak demands are determined for each of a plurality of items. A desired service level metric range is determined at operation 202, and at operation 204, a desired resource metric range is determined.

The resource metric may be an average inventory investment amount, a maximum inventory investment amount, an amount of cash outlays to replenish stock, a volume of inventory, a weight of inventory, an amount of storage space required for inventory, an inventory turn rate, and a loss rate due to shelf life expirations. The resource metric range is a desired range of resource metrics that is acceptable to a user using the item replenishment policy. The inventory turn rate is a rate used to measure how fast the inventory that is stocked is sold.

In operation 206, order quantities are assigned to each of the items. Order quantities are assigned to the items to be replenished based on price, in which less expensive items are typically assigned larger quantities and more expensive items are assigned lesser quantities. The discrepancy between assigned order quantities is based on the theory that larger order quantities being set for inexpensive items avoids the excessive administrative costs and workload that would result from frequent procurements of the items.

In operation 208, the plurality of items is ranked, based on unit price, to produce a ranked list. The ranked items are thereafter divided into groups of price percentiles at operation 210. For example, the items may be divided into $25^{th}$, $50^{th}$ and $75^{th}$ price percentiles, in which case the groups of price percentiles may be from the $1^{st}$-$25^{th}$, $26^{th}$-$49^{th}$, $50^{th}$-$74^{th}$ and $75^{th}$-$100^{th}$ percentiles. Then, at operation 212, price-based multipliers are assigned to each of the plurality of items, based on the respective price percentiles. Higher multipliers are typically applied to less expensive items and lower multipliers are applied to more expensive items. For example, an item with a unit price of $2.00 might use a multiplier of 5.0, while an item with a unit price of $3000 might use a multiplier of 0.3. In other words, the multipliers are applied at rates based on the cost of the item. Thus, the supplier can afford a greater level of protection against backorders for the less expensive item than for the more expensive item.

Stock levels for each of the items are then determined at operation 214 by multiplying the peak demand of each item and the assigned price-based multipliers. At operation 216, a resource metric based on the determined stock levels is determined for each of the items and respective order quantities.

A service level metric is determined at operation 218 that is based on the determined stock levels for each of the items and the respective order quantities. The service level metric is determined based on one or more of the following: a customer wait-time, a unit wait-time, a requisition wait-time, a unit fill rate, a requisition fill rate, an average number of outstanding backorders, an average backorder duration, a supply availability, a material availability, a system down time due to lack of parts, a percent of systems down due to lack of parts, a number of cannibalizations performed and a number of expediting actions required. A number of cannibalizations performed to obtain an item from, for example, an aircraft in order to provide a part for another aircraft is typically minimized because increases in cannibalizations increase maintenance costs, increase workload of mechanics, result in increased broken parts, etc. Therefore, it is preferable to maintain the number of cannibalizations to a minimum, and thus the proposed ordering policy of the present invention may use a number of cannibalizations as a service level metric. The unit fill rate is the percentage of customer requests that are immediately satisfied.

The resource metric and the service level metric are thereafter compared, at operation 220, with the desired resource metric range previously set and the desired service level metric range previously set, respectively. A determination is then made as to whether the resource metric and the service level metric fall within the desired resource metric range and the desired service level metric range, respectively.

The operations above with respect to dividing the ranked list, assigning multipliers, determining stock levels, resource metrics and service level metrics, comparing the resource metrics and service level metrics to the desired resource metric range and desired service level metric range, respectively, to determine whether the determined stock levels are the desired stock levels may be repeated if at least one of the resource metric and service level metric do not fall within the desired resource metric range and the service level metric range, respectively until the resource metric and the service level metric both fall with the desired resource metric and service level metric ranges, respectively.

Figure 3:
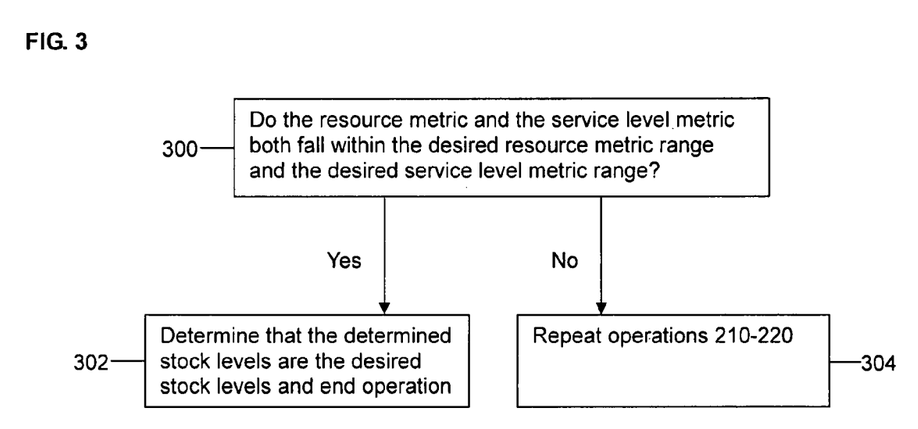
FIG. 3 is a flowchart of a method of determining whether new multipliers are to be assigned, according to the first embodiment.

FIG. 3 shows a flowchart of a determination as to whether the resource metric and the service level metric fall within the desired ranges. In operation 300, a determination is made, based on the comparison in operation 220, as to whether the determined stock levels are the desired stock levels. At operation 302, the determined stock levels are determined as the desired stock levels if the resource metric and the service level metric both fall within the desired resource metric range and the desired service level metric range. If the resource metric and service level metric both fall within the desired resource metric range and the desired service level metric range, respectively, the operation ends. If one or both of the resource metric and service level metric do not fall within the desired resource metric range and desired service level metric range, respectively, at operation 304, operations 210-220 are repeated with new multipliers and the ranked list may be further divided.

For example, if the resource metric at issue is inventory cost and the service level metric at issue is customer wait-time, the wait-time does not fall within a desired wait-time range, but the inventory cost does fall within a desired inventory investment level range, a multiplier may be increased for the items in the bottom $50^{th}$ price percentile while the multiplier is maintained for the items in the top $50^{th}$ price percentile. If the service level at issue is customer wait-time, the wait-time does fall within the desired wait-time range, and the inventory cost does not fall within the desired inventory investment level range, for example, a multiplier for the items in the bottom $50^{th}$ price percentile may be maintained, while a multiplier for the items in the top $50^{th}$ price percentile may be decreased. The multipliers may be increased or decreased based on whether or not the service level and the inventory cost of the items at issue fall within a specified service level range and inventory investment level range.

Figure 4:
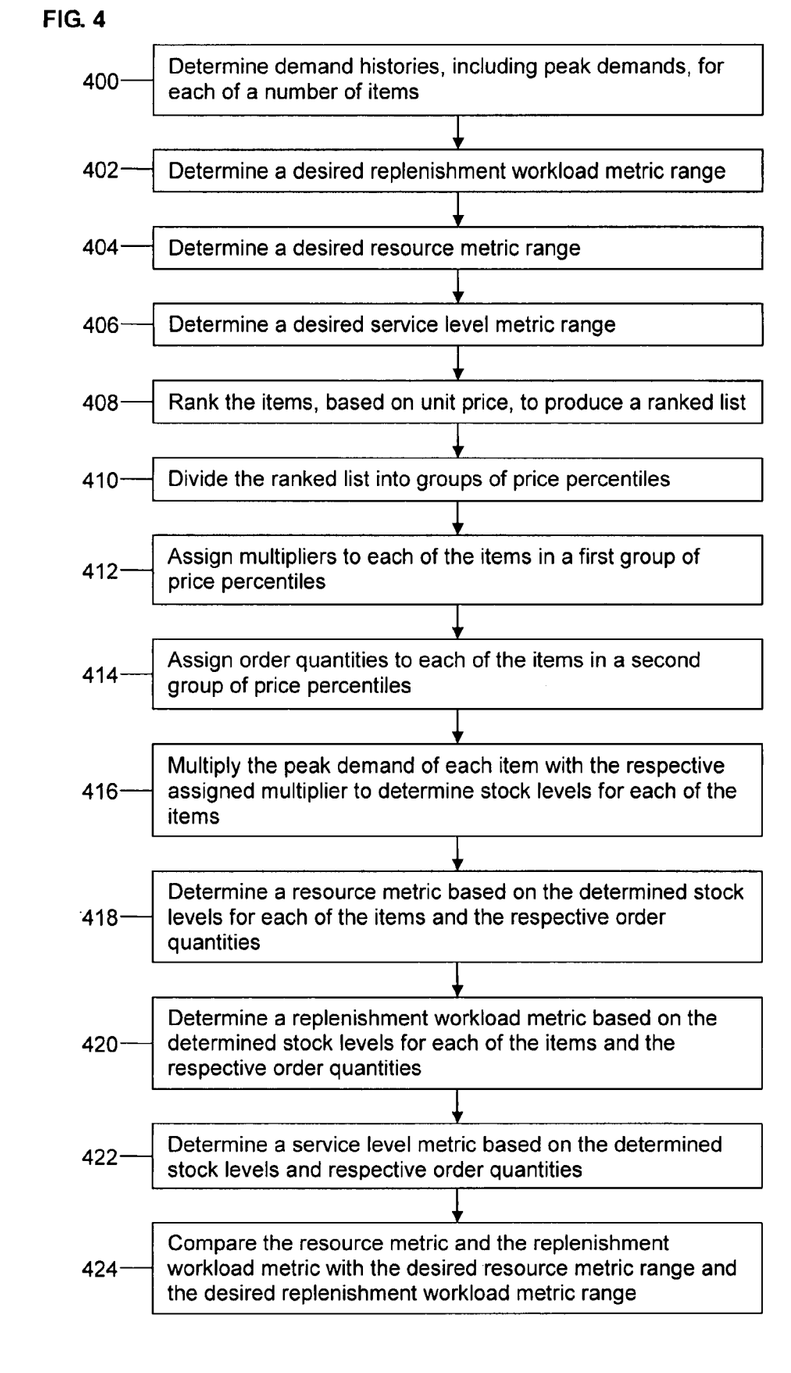
FIG. 4 is a flowchart of a method of determining order quantities, according to a second embodiment.

In a second embodiment, FIG. 4 shows a flowchart for determining desired order quantities. At operation 400, demand histories including peak demands are determined for each of a plurality of items. A desired replenishment workload metric range is determined at operation 402, and at operation 404, a desired resource workload metric range is determined. A desired service level range may additionally be determined at operation 406.

The items are ranked by unit price in operation 408 and the ranked list is divided into groups of price percentiles at operation 410, for example, a first set of groups of price percentiles and a second set of groups of price percentiles. The first set of groups of price percentiles may be, for example, $1^{st}$-$26^{th}$, $26^{th}$-$49^{th}$, $50^{th}$-$100^{th}$, and $75^{th}$-$100^{th}$ percentiles, while the second set of groups of price percentiles may be, for example, $1^{st}$-$33^{rd}$, $34^{th}$-$66^{th}$ and $67^{th}$-$100^{th}$ percentiles. At operation 412, multipliers are assigned to each of the items in the first group of price percentiles and order quantities are assigned to each of the items in the second group of price percentiles, in operation 414. In operation 416, the peak demand of each item is multiplied with the respective assigned multiplier to determine stock levels for each of the items.

The stock levels determined in operation 416 are combined with the order quantities assigned in operation 414 to determine the resource metric, for example, inventory cost in operation 418.

The calculated stock levels and assigned order quantities determined at operations 416 and 414, respectively, are used to determine a replenishment workload metric at operation 420 and may optionally be used to determine a service level metric at operation 422. The replenishment workload metric is determined based on at least one of a number of replenishment actions, a number of man hours spent on replenishment actions, an amount of money spent on replenishment actions, and a number of contracting actions.

At operation 424, the resource metric and the replenishment workload metric are compared with the desired resource metric range and the desired replenishment workload metric range.

Figure 5:
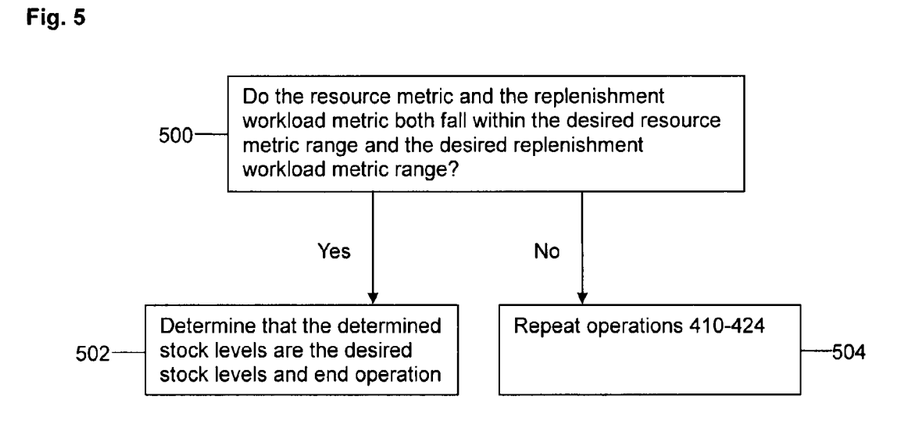
FIG. 5 is a flowchart of a method of determining whether new multipliers and order quantities are to be assigned, according to the second embodiment.

Turning to FIG. 5, at operation 500, a determination is made, based on the comparison in operation 424, as to whether the determined order quantities are the desired order quantities. At operation 502, determined order quantities are determined as the desired order quantities if the resource metric and the replenishment workload metric both fall within the desired resource metric range and the desired replenishment workload metric range. If the resource metric and replenishment workload metric both fall within their respective ranges, the operation ends. If one or both of the resource metric and replenishment workload metric do not fall within the desired resource metric range and desired replenishment workload metric range, respectively, at operation 504, operations 410-424, with the exception of operation 422, are repeated with new multipliers and order quantities and the ranked list may be further divided.

Optionally, the service level metric determined at operation 422 may be compared with the desired service level metric range to determine whether the service level metric falls within the desired service level metric range, and the determined order quantities are determined to be the desired order quantities if, additionally, the service level metric falls within the desired service level metric range. Further, optionally at operation 504, if one or more of the resource metric, the replenishment workload metric and the service level metric do not fall within the desired ranges, respectively, new multipliers and order quantities are assigned to the price percentiles and the ranked list may be further divided.

In another embodiment, a graphical representation of desired metrics may be obtained by creating a curve based on the desired metrics using the proposed method. The creation of the curve based on the desired metrics allows for comparison between assigned multipliers and a resulting first metric in relation to a resulting second metric, for example, inventory cost in relation to customer wait time. The resulting curve allows a user to make comparisons between different parameter models to determine the most effective parameter model for specific metrics.

Figure 6:
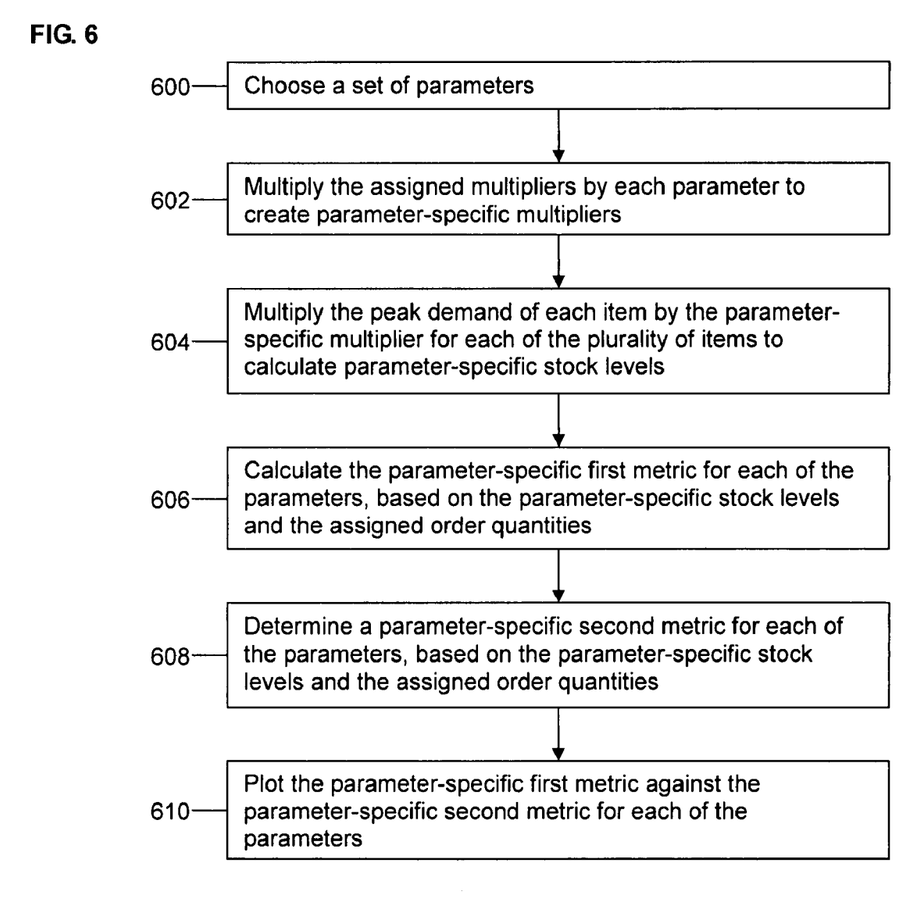
FIG. 6 is a flowchart of a method of creating a metrics curve, according to a third embodiment.

FIG. 6 is a flowchart of a method of creating a metrics curve according to another embodiment.

Figure 7:
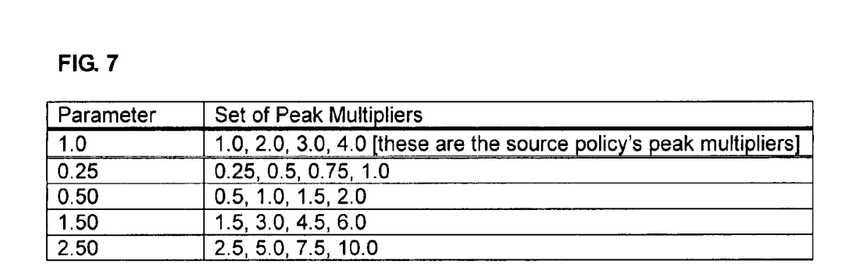
FIG. 7 is chart illustrating an example of a set of parameters and corresponding peak multipliers for the parameters.

At operation 600, a set of parameters is chosen to be used in creating a metrics curve. The set of parameters is generally chosen based on a parameter representing a source policy determined by using the method of the first embodiment. For example, if the source policy uses a parameter of 1.0, in order to create a curve extending in both directions from the source policy parameter, a set of parameters used will be parameters which are less than and greater than the source policy parameter of (i.e., 0.25, 0.50, 0.75, 1.0, 1.5, 2.0, 2.5 and 3.0). The parameters must vary enough so that there is sufficient variation in the values of the metrics to draw a full curve. FIG. 7 is a chart showing an example of a set of parameters and a set of peak multipliers for each of the parameters.

At operation 602, for each parameter in the set, the assigned multipliers are multiplied by the parameter to determine parameter-specific multipliers for each parameter. The peak demand of each item is then multiplied by the parameter-specific multiplier for each of the items to calculate parameter-specific stock levels for each parameter at operation 604. A parameter-specific first metric, for example, inventory cost, for each of the parameters is calculated in operation 606, based on the parameter-specific stock levels and the assigned order quantities for each of the items. A parameter-specific second metric, for example, customer wait time, is determined, at operation 608, for each of the parameters based on the parameter-specific stock levels and the assigned order quantities for each of the plurality of items. The parameter-specific first metric is plotted against the parameter-specific second metric for each of the parameters on a single plot to create a metrics curve, in operation 610.

The parameter-specific metrics may be, for example, a resource metric, a service level metric, and a replenishment workload metric.

Figure 8:
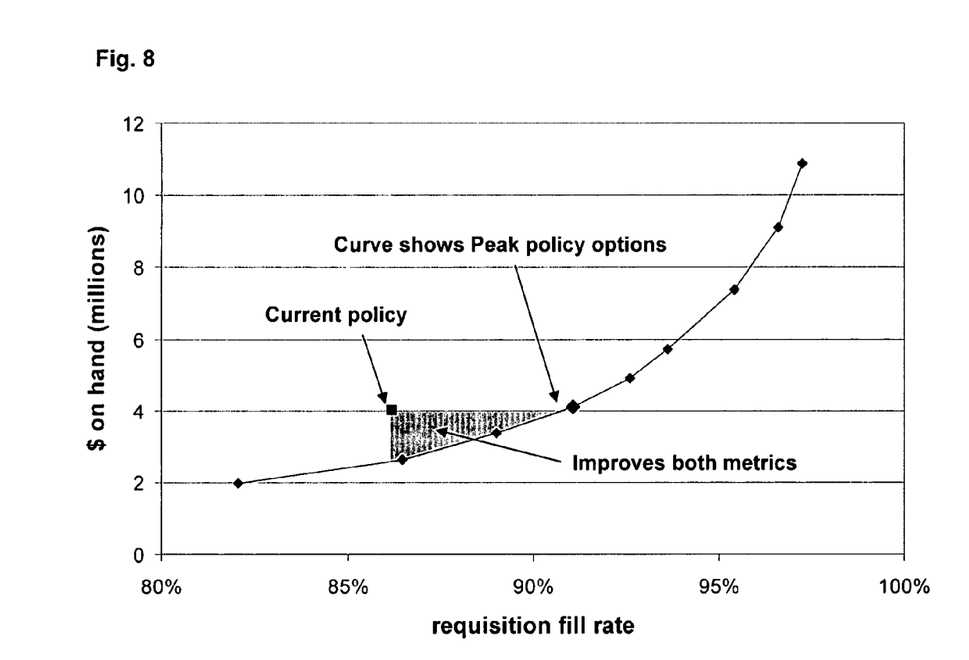
FIG. 8 is a metrics graph and curve, according to the third embodiment.

FIG. 8 is an example of a graph illustrating the metrics curve described above in FIG. 6.

FIG. 8 illustrates a graph of one metric, such as inventory investment, against another metric, such as requisition fill rate. Thus, by assigning new multipliers and plotting one metric against another metric, based on the preferred metrics, the best multipliers for optimal desired metrics performance can be determined.

For example, a user may be more concerned with reducing inventory investment while maintaining customer service, with respect to a prespecified inventory investment level and a prespecified customer service level. Thus, the metrics curves created would determine the multipliers resulting in the lowest inventory investment and the highest customer service level.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method for determining desired stock levels, comprising:
    causing a computer to execute:
        determining demand histories, including peak demands, for each of a plurality of items;
        determining a desired service level metric range;
        determining a desired resource metric range;
        assigning order quantities to each of the plurality of items;
        ranking the plurality of items, based on unit price, to produce a ranked list;
        dividing the ranked list into groups of price percentiles;
        assigning multipliers to each of the plurality of items, based on the respective groups of price percentiles;
        determining stock levels for each of the plurality of items by multiplying the peak demand of each item and the respective assigned multiplier;
        determining a resource metric based on the determined stock levels for each of the plurality of items and the respective order quantities;
        determining a service level metric based on the determined stock levels for each of the plurality of items and the respective order quantities;
        comparing the resource metric and the service level metric with the desired resource metric range and the desired service level metric range, respectively, and determining whether the resource metric and the service level fall within the desired resource metric range and the desired service level metric range, respectively; and
        determining that the determined stock levels are the desired stock levels if the resource metric and the service level metric fall within the desired resource metric range and the desired service level metric range, respectively.

2. The method according to claim 1, wherein the resource metric is determined based on at least one of an average inventory investment amount, a maximum inventory investment amount, an amount of cash outlays to replenish stock, a volume of inventory, a weight of inventory, an amount of storage space required for inventory, an inventory turn rate, and a loss rate due to shelf life expirations.

3. The method according to claim 1, wherein the service level metric is determined based on at least one of a customer wait-time, a unit wait-time, a requisition wait-time, a unit fill-rate, a requisition fill-rate, an average number of outstanding backorders, an average backorder duration, a supply availability, a material availability, a system down time due to lack of parts, a percent of systems down due to lack of parts, a number of cannibalizations performed, and a number of expediting actions required.

4. The method according to claim 1, further comprising repeating the dividing the ranked list, the assigning multipliers, the determining stock levels, the determining the resource metric, the determining the service level metric, the comparing the resource metric and the service level metric with the desired resource metric range and the desired service level metric, and the determining whether the determined stock levels are the desired stock levels, if at least one of the resource metric and the service level metric do not fall within the desired resource metric range and the desired service level metric range, respectively.

5. The method according to claim 1, wherein the price percentiles are quartiles.

6. The method according to claim 1, wherein multipliers are assigned such that smaller multipliers are used for more expensive items and larger multipliers are used for less expensive items.

7. The method according to claim 1, further comprising:
    determining price-based multipliers;
    determining a plurality of parameters;
    scaling the price-based peak multipliers by each of the plurality of parameters;
    determining a resource metric and a service level metric for each of the plurality of parameters; and
    creating a metrics curve using the determined resource metric and the determined service level metric, by plotting the determined resource metric against the determined service level metric.

8. The method according to claim 7, wherein the determining a resource metric and a service level metric for each of the plurality of parameters comprises:

multiplying the peak demand of each item by the scaled price-based peak multiplier for each of the plurality of items to calculate parameter-specific stock levels for each parameter;

calculating a parameter-specific resource metric for each of the parameters based on the parameter-specific stock levels and the assigned order quantities for each of the plurality of items; and determining a parameter-specific service level metric for each of the parameters based on the calculated parameter-specific stock levels and the assigned order quantities for each of the plurality of items.

9. A method for determining desired order quantities, comprising:

causing a computer to execute:

determining demand histories, including peak demands, for each of a plurality of items;

determining a desired replenishment workload metric range;

determining a desired resource metric range;

ranking the plurality of items, based on unit price, to produce a ranked list;

dividing the ranked list into groups of price percentiles;

assigning order quantities to each of the plurality of items;

assigning multipliers to each of the plurality of items, based on the respective groups of price percentiles;

calculating stock levels for each of the plurality of items by multiplying the peak demand of each item and the respective multiplier;

determining a resource metric based on the stock levels determined for each of the plurality of items and the respective order quantities;

determining a replenishment workload metric based on the calculated stock levels and the respective order quantities;

comparing the resource metric and the replenishment workload metric with the desired resource metric range and the desired replenishment workload metric range, and determining whether the resource metric and the replenishment workload metric falls within the desired resource metric range and the desired replenishment workload metric range, respectively; and determining that the assigned order quantities are the desired order quantities if the resource metric and the replenishment workload metric fall within the desired resource metric range and the desired replenishment workload metric range, respectively.

10. The method according to claim 9, further comprising assigning multipliers to each of the plurality of items, based on a first set of groups of price percentiles and assigning order quantities to each of the plurality of items, based on a second set of groups of price percentiles, before calculating the stock levels for each of the items.

11. The method according to claim 9, further comprising:

determining a desired service level metric range;

determining a service level metric based on the stock levels determined for each of the plurality of items and the respective order quantities after the assigning order quantities and the calculating stock levels for each of the plurality of items;

comparing the service level metric with the desired service level metric range to determine whether the service level metric falls within the desired service level metric range; and determining that the assigned order quantities are the desired order quantities if the resource metric, the replenishment workload metric and the service level metric fall within the desired resource metric range, the desired replenishment workload metric range, and the desired service level metric range, respectively.

12. The method according to claim 11, wherein the service level metric is determined based on at least one of a customer wait-time, a unit wait-time, a requisition wait-time, a unit fill-rate, a requisition fill-rate, an average number of outstanding backorders, an average backorder duration, a supply availability, a material availability amount, a system down time due to lack of parts, a percent of systems down due to lack of parts, a number of cannibalizations performed, and a number of expediting actions required.

13. The method according to claim 9, wherein the resource metric is determined based on at least one of an average inventory investment amount, a maximum inventory investment amount, an amount of cash outlays to replenish stock, a volume of inventory, a weight of inventory, an amount of storage space required for inventory, an inventory turn rate, and a loss rate due to shelf life expirations.

14. The method according to claim 9, wherein the replenishment workload metric is determined based on at least one of a number of replenishment actions, a number of man hours spent on replenishment actions, an amount of money spent on replenishment actions, and a number of contracting actions.

15. The method according to claim 9, further comprising repeating the dividing the ranked list, the assigning multipliers, the assigning order quantities, the determining stock levels, the determining the resource metric, the determining the replenishment workload metric, the comparing the resource metric and the replenishment workload metric with the desired resource metric range and the desired replenishment workload metric range, and the determining whether the determined stock levels are the desired stock levels, if at least one of the resource metric and the replenishment workload metric do not fall within the desired resource metric range and the desired replenishment workload metric range, respectively.

16. The method according to claim 11, further comprising repeating the dividing the ranked list, the assigning multipliers, the determining stock levels, the determining the resource metric, the determining the replenishment workload metric, the determining the service level metric, the comparing the resource metric, the replenishment workload metric and the service level metric with the desired resource metric range, the desired replenishment workload metric range and the desired service level metric, respectively, and the determining whether the assigned order quantities are the desired order quantities, if at least one of the resource metric, the replenishment workload metric and the service level metric do not fall within the desired resource metric range, the desired replenishment workload metric range and the desired service level metric range, respectively.

17. The method according to claim 9, wherein the price percentiles are quartiles.

18. The method according to claim 9, wherein multipliers are assigned such that smaller multipliers are used for more expensive items and larger multipliers are used for less expensive items.

19. The method according to claim 9, further comprising:
   determining price-based multipliers;
   determining a plurality of parameters;
   scaling the price-based peak multipliers by each of the plurality of parameters;
   determining a resource metric and a replenishment workload metric for each of the plurality of parameters; and
   creating a metrics curve using the determined resource metric and the determined replenishment workload metric, by plotting the determined resource metric against the determined replenishment workload metric.

20. The method according to claim 19, wherein the determining a resource metric and a replenishment workload metric for each of the plurality of parameters comprises:
   multiplying the peak demand of each item by the scaled price-based peak multiplier for each of the plurality of items to calculate parameter-specific stock levels for each parameter;
   calculating a parameter-specific resource metric for each of the parameters based on the parameter-specific stock levels and the assigned order quantities for each of the plurality of items; and
   determining a parameter-specific replenishment workload metric for each of the parameters based on the calculated parameter-specific stock levels and the assigned order quantities for each of the plurality of items.

21. A computer-readable storage medium encoded with instructions for causing a processor to execute a method of determining desired stock levels, comprising:
   determining demand histories, including peak demands, for each of a plurality of items;
   determining a desired service level metric range;
   determining a desired resource metric range;
   assigning order quantities to each of the plurality of items;
   ranking the plurality of items, based on unit price, to produce a ranked list;
   dividing the ranked list into groups of price percentiles;
   assigning multipliers to each of the plurality of items, based on the respective groups of price percentiles;
   determining stock levels for each of the plurality of items by multiplying the peak demand of each item and the respective assigned multiplier;
   determining a resource metric based on the determined stock levels for each of the plurality of items and the respective order quantities;
   determining a service level metric based on the determined stock levels for each of the plurality of items and the respective order quantities;
   comparing the resource metric and the service level metric with the desired resource metric range and the desired service level metric range, respectively, and determining whether the resource metric and the service level fall within the desired resource metric range and the desired service level metric range, respectively; and
   determining that the determined stock levels are the desired stock levels if the resource metric and the service level metric fall within the desired resource metric range and the desired service level metric range, respectively.

22. The computer-readable medium according to claim 21, wherein the resource metric is determined based on at least one of an average inventory investment amount, a maximum inventory investment amount, an amount of cash outlays to replenish stock, a volume of inventory, a weight of inventory, an amount of storage space required for inventory, an inventory turn rate, and a loss rate due to shelf life expirations.

23. The computer-readable medium according to claim 21, wherein the service level metric is determined based on at least one of a customer wait-time, a unit wait-time, a requisition wait-time, a unit fill-rate, a requisition fill-rate, an average number of outstanding backorders, an average backorder duration, a supply availability, a material availability, a system down time due to lack of parts, a percent of systems down due to lack of parts, a number of cannibalizations performed, and a number of expediting actions required.

24. The computer-readable medium according to claim 21, further comprising repeating the dividing the ranked list, the assigning multipliers, the determining stock levels, the determining the resource metric, the determining the service level metric, and the comparing the resource metric and the service level metric with the desired resource metric range and the desired service level metric, if at least one of the resource metric and the service level metric do not fall within the desired resource metric range and the desired service level metric range, respectively.

25. The computer-readable medium according to claim 21, wherein the price percentiles are quartiles.

26. The computer-readable medium according to claim 21, wherein multipliers are assigned such that smaller multipliers are used for more expensive items and larger multipliers are used for less expensive items.

27. The computer-readable medium according to claim 21, further comprising:
   determining price-based multipliers;
   determining a plurality of parameters;
   scaling the price-based peak multipliers by each of the plurality of parameters;
   determining a resource metric and a service level metric for each of the plurality of parameters; and
   creating a metrics curve using the determined resource metric and the determined service level metric, by plotting the determined resource metric against the determined service level metric.

28. The computer-readable medium according to claim 27, wherein the determining a resource metric and a service level metric for each of the plurality of parameters comprises:
   multiplying the peak demand of each item by the scaled price-based peak multiplier for each of the plurality of items to calculate parameter-specific stock levels for each parameter;
   calculating a parameter-specific resource metric for each of the parameters based on the parameter-specific stock levels and the assigned order quantities for each of the plurality of items; and
   determining a parameter-specific service level metric for each of the parameters based on the calculated parameter-specific stock levels and the assigned order quantities for each of the plurality of items.

29. A computer-readable storage medium encoded with instructions for causing a processor to execute a method for determining desired order quantities, comprising:
   determining demand histories, including peak demands, for each of a plurality of items;
   determining a desired replenishment workload metric range;
   determining a desired resource metric range;
   ranking the plurality of items, based on unit price, to produce a ranked list;
   dividing the ranked list into groups of price percentiles;
   assigning order quantities to each of the plurality of items;
   assigning multipliers to each of the plurality of items, based on the respective groups of price percentiles;
   calculating stock levels for each of the plurality of items by multiplying the peak demand of each item and the respective multiplier;

determining a resource metric based on the stock levels determined for each of the plurality of items and the respective order quantities;

determining a replenishment workload metric based on the calculated stock levels and the respective order quantities;

comparing the resource metric and the replenishment workload metric with the desired resource metric range and the desired replenishment workload metric range, and determining whether the resource metric and the replenishment workload metric falls within the desired resource metric range and the desired replenishment workload metric range, respectively; and determining that the assigned order quantities are the desired order quantities if the resource metric and the replenishment workload metric fall within the desired resource metric range and the desired replenishment workload metric range, respectively.

30. The computer-readable medium according to claim 29, further comprising assigning multipliers to each of the plurality of items, based on a first group of price percentiles and assigning order quantities to each of the plurality of items, based on a second group of price percentiles, before calculating the stock levels for each of the items.

31. The computer-readable medium according to claim 29, further comprising:

determining a desired service level metric range;

determining a service level metric based on the stock levels determined for each of the plurality of items and the respective order quantities after the assigning order quantities and the calculating stock levels for each of the plurality of items;

comparing the service level metric with the desired service level metric range to determine whether the service level metric falls within the desired service level metric range; and determining that the assigned order quantities are the desired order quantities if the resource metric, the replenishment workload metric and the service level metric fall within the desired resource metric range, the desired replenishment workload metric range, and the desired service level metric range, respectively.

32. The computer-readable medium according to claim 31, wherein the service level metric is determined based on at least one of a customer wait-time, a unit wait-time, a requisition wait-time, a unit fill-rate, a requisition fill-rate, an average number of outstanding backorders, an average backorder duration, a supply availability, a material availability, a system down time due to lack of parts, a percent of systems down due to lack of parts, a number of cannibalizations performed, and a number of expediting actions required.

33. The computer-readable medium according to claim 29, wherein the resource metric is determined based on at least one of an average inventory investment amount, a maximum inventory investment amount, an amount of cash outlays to replenish stock, a volume of inventory, a weight of inventory, an amount of storage space required for inventory, an inventory turn rate, and a loss rate due to shelf life expirations.

34. The computer-readable medium according to claim 29, wherein the replenishment workload metric is determined based on at least one of a number of replenishment actions, a number of man hours spent on replenishment actions, an amount of money spent on replenishment actions, and a number of contracting actions.

35. The computer-readable medium according to claim 29, further comprising repeating the dividing the ranked list, the assigning multipliers, the assigning order quantities, the determining stock levels, the determining the resource metric, the determining the replenishment workload metric, the comparing the resource metric and the replenishment workload metric with the desired resource metric range and the desired replenishment workload metric range, and the determining whether the determined stock levels are the desired stock levels, if at least one of the resource metric and the replenishment workload metric do not fall within the desired resource metric range and the desired replenishment workload metric range, respectively.

36. The computer-readable medium according to claim 31, further comprising repeating the dividing the ranked list, the assigning multipliers, the determining stock levels, the determining the resource metric, the determining the replenishment workload metric, the determining the service level metric, the comparing the resource metric, the replenishment workload metric and the service level metric with the desired resource metric range, the desired replenishment workload metric range and the desired service level metric, respectively, and the determining whether the assigned order quantities are the desired order quantities, if at least one of the resource metric, the replenishment workload metric and the service level metric do not fall within the desired resource metric range, the desired replenishment workload metric range and the desired service level metric range, respectively.

37. The computer-readable medium according to claim 29, wherein the price percentiles are quartiles.

38. The computer-readable medium according to claim 29, wherein multipliers are assigned such that smaller multipliers are used for more expensive items and larger multipliers are used for less expensive items.

39. The computer-readable medium according to claim 29, further comprising:

determining price-based multipliers;

determining a plurality of parameters;

scaling the price-based peak multipliers by each of the plurality of parameters;

determining a resource metric and a replenishment workload metric for each of the plurality of parameters; and creating a metrics curve using the determined resource metric and the determined replenishment workload metric, by plotting the determined resource metric against the determined replenishment workload metric.

40. The computer-readable medium according to claim 39, wherein the determining a resource metric and a replenishment workload metric for each of the plurality of parameters comprises:

multiplying the peak demand of each item by the scaled price-based peak multiplier for each of the plurality of items to calculate parameter-specific stock levels for each parameter;

calculating a parameter-specific resource metric for each of the parameters based on the parameter-specific stock levels and the assigned order quantities for each of the plurality of items; and determining a parameter-specific replenishment workload metric for each of the parameters based on the calculated parameter-specific stock levels and the assigned order quantities for each of the plurality of items.

* * * * *